United States Patent
Maxwell et al.

(10) Patent No.: US 7,660,584 B2
(45) Date of Patent: Feb. 9, 2010

(54) USING AN ACCESS POINT NAME TO SELECT AN ACCESS GATEWAY NODE

(75) Inventors: Stewart H. Maxwell, Dallas, TX (US); Jerry L. Mizell, Plano, TX (US)

(73) Assignee: Nortel Networks Limited, St. Laurent, Quebec (CA)

( * ) Notice: Subject to any disclaimer, the term of this patent is extended or adjusted under 35 U.S.C. 154(b) by 500 days.

(21) Appl. No.: 11/433,870

(22) Filed: May 12, 2006

(65) Prior Publication Data

US 2006/0258356 A1 Nov. 16, 2006

Related U.S. Application Data

(60) Provisional application No. 60/680,456, filed on May 12, 2005.

(51) Int. Cl.
*H04W 36/00* (2009.01)
(52) U.S. Cl. .................. 455/436; 455/442; 370/331
(58) Field of Classification Search .......... 455/436, 455/437, 438, 440, 442, 550.1, 552.1, 553.1; 370/395.5, 395.52, 331
See application file for complete search history.

(56) References Cited

U.S. PATENT DOCUMENTS 6,615,269 B1 9/2003 Suumäki et al.

2003/0114158 A1 6/2003 Soderbacka et al.
2004/0243720 A1 12/2004 Haumont et al.
2004/0264476 A1 12/2004 Alarcon et al.

OTHER PUBLICATIONS

3rd Generation Partnership Project, "3GPP TS 23.003 V6.9.0 (Mar. 2006), 3rd Generation Partnership Project; Technical Specification Group Core Network and Terminals; Numbering, Addressing and Identification (Release 6)," pp. 1-50 (2006).
3rd Generation Partnership Project, "3GPP TS 23.060 V6.12.0 (Mar. 2006), 3rd Generation Partnership Project; Technical Specification Group Services and System Aspects; General Packet Radio Service (GPRS); Service Description; Stage 2 (Release 6)," pp. 1-212 (2006).
3rd Generation Partnership Project, "3GPP TS 23.234 V6.8.0 (Mar. 2006), 3rd Generation Partnership Project; Technical Specification Group Services and System Aspects; 3GPP System to Wireless Local Area Network (WLAN) Interworking; System Description (Release 6)," pp. 1-80 (2006).

(Continued)

*Primary Examiner*—Thanh C Le
(74) *Attorney, Agent, or Firm*—Trop Pruner & Hu, P.C.

(57) ABSTRACT

A first access point name associated with an access gateway node involved in a data session of a mobile station over a first type of wireless network is received. In response to handoff of the mobile station from the first type of wireless network to a second, different type of wireless network, the first access point name is transmitted to enable continued use of the access gateway node for the data session of the mobile station over the second type of wireless network.

23 Claims, 6 Drawing Sheets

OTHER PUBLICATIONS

Network Working Group, RFC 1332, "The PPP Internet Protocol Control Protocol (IPCP)," pp. 1-12 (May 1992).

Network Working Group, RFC 1700, "Assigned Numbers," pp. 1-230 (Oct. 1994).

Network Working Group, RFC 2153, "PPP Vendor Extensions," pp. 1-6 (May 1997).

Network Working Group, RFC 3115, "Mobile IP Vendor/Organization-Specific Extensions," pp. 1-9 (Apr. 2001).

Network Working Group, RFC 3344, "IP Mobility Support for IPv4," pp. 1-99 (Aug. 2002).

Network Working Group, RFC 3775, "Mobility Support in IPv6," pp. 1-165 (Jun. 2004).

Network Working Group, RFC 4306, "Internet Key Exchange (IKEv2) Protocol," pp. 1-99 (Dec. 2005).

USING AN ACCESS POINT NAME TO SELECT AN ACCESS GATEWAY NODE

CROSS-REFERENCE TO RELATED APPLICATION

This claims the benefit under 35 U.S.C. § 119(e) of U.S. Provisional Application Ser. No. 60/680,456, entitled "Multi-Access Mobility Using Temporary APN," filed May 12, 2005, which is hereby incorporated by reference.

TECHNICAL FIELD

The invention relates to using an access point name to select an access gateway node in a handover from a first type of wireless network to a second, different type of wireless network.

BACKGROUND

Mobile communications systems are made up of a plurality of cells or cell sectors. Each cell or cell sector provides a radio communications center through which a mobile station establishes a call or other communications session with another mobile station or a terminal connected to either a circuit-switched network (e.g., public-switched telephone network or PSTN) or a packet-switched data network. Each cell or cell sector includes a base station (or access point) and a base station controller (or radio network controller) to enable communications with mobile stations in the cell or cell sector.

Wireless networks are capable of carrying both circuit-switched and packet-switched traffic (e.g., voice traffic, data traffic, etc.). Examples of wireless networks that support communication of packet-switched traffic include those that operate according to the GSM (Global System for Mobile) and UMTS (Universal Mobile Telecommunications System) standards, as defined by the Third Generation Partnership Project (3GPP).

Other types of wireless networks include enterprise and residential wireless local area networks (WLANs). A WLAN refers to a local area network that mobile stations can access wirelessly. A WLAN is a private network, either owned by an organization or municipality (enterprise) or by an individual. A WLAN is usually secured such that only authorized users are allowed to use the WLAN. A WLAN differs from a public cellular wireless network in that the WLAN is limited for use by users of a specific enterprise or a group, whereas the public cellular wireless network is for general use of subscribers of the cellular wireless network. Examples of standards that define WLANs include IEEE (Institute of Electrical and Electronic Engineers) 802.11, 802.11a, 802.11b, 802.11g, Bluetooth, WiMAX (Worldwide Interoperability for Microwave Access), 802.16, 802.20, and so forth. Technologies employed in such networks can include spread spectrum technologies such as CDMA and orthogonal frequency division multiplexing (OFDM).

When a mobile station establishes a data session with an external network device that is located outside the wireless network, the external network device perceives the mobile station as being located at an access gateway that couples wireless network devices to an external data network (e.g., Internet or other type of data network). In the WLAN context, this access gateway is referred to as a packet data gateway (PDG). For a GSM or UMTS wireless network, the access gateway is referred to as a GGSN (Gateway GPRS Support Node). The access gateway is the point to which data packets containing the mobile station's external IP (Internet Protocol) address are routed.

Typically, several GGSNs and PDGs are deployed in a wireless network, with the multiple GGSNs and PDGs performing load sharing to enhance bandwidth for packet data sessions. The GGSNs and PDGs can be considered functions deployed on corresponding access gateway nodes. A mobile station is able to transition (hand off) between a GSM/UMTS access network and a WLAN access network. If the mobile station is initially connected to a first wireless access network (e.g., a GSM/UMTS access network) and has an existing data session with a particular access gateway node, and the mobile station transitions to a second wireless access network (e.g., a WLAN access network), there is no way to guarantee that the new packet data session using the second wireless access network will be hosted by the same access gateway node as that used with the first wireless access network. If the packet data session switches to a different access gateway node as a result of the transition (handoff), then the external IP address for the mobile station may change. Changing the external IP address of the mobile station during a data session is associated with various undesirable issues.

SUMMARY

In general, according to an embodiment, a method comprises receiving a first access point name associated with an access gateway node involved in a data session of a mobile station over a first type of wireless network, and in response to handoff of the mobile station from the first type of wireless network to a second, different type of wireless network, transmitting the first access point name to enable continued use of the access gateway node for the data session of the mobile station over the second type of wireless network.

Other or alternative features will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

Figure 1:
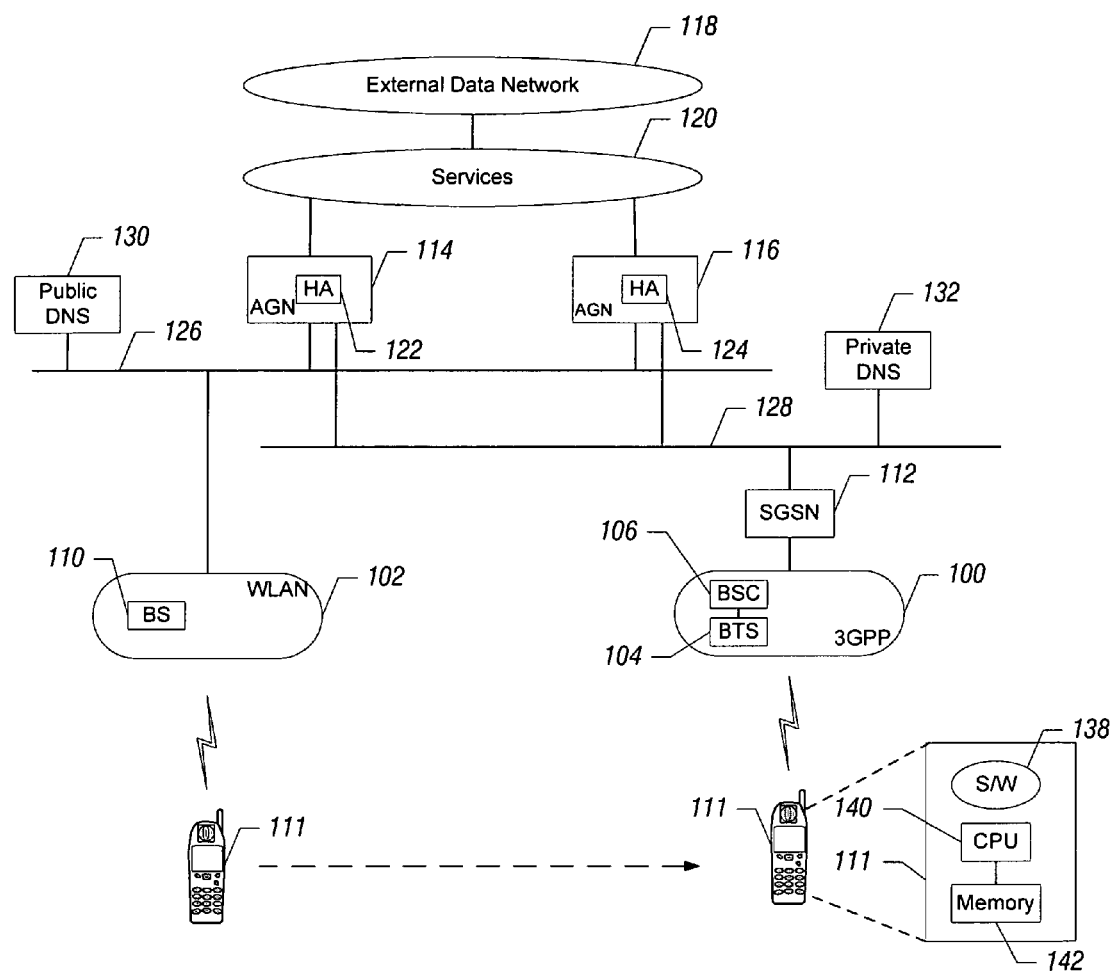
FIG. 1 illustrates an example arrangement of a communications network that includes a first type of wireless network (e.g., GSM/UMTS network) and a second type of wireless network (e.g., wireless LAN), in which some embodiments of the invention is incorporated.

FIG. 1 illustrates a communications network that includes a first type of wireless access network 100 and a second type of wireless access network 102. In one example, the first type of wireless access network 100 can be a GPRS (General Packet Radio Service) network, such as the GPRS network used in a GSM (Global System for Mobile) or UMTS (Universal Mobile Telecommunications System) network, as defined by the Third Generation Partnership Project (3GPP). Alternatively, in another example, the first type of wireless access network 100 can be a CDMA 2000 wireless network, such as a 1xRTT or a 1xEV-DO network. The CDMA 2000 family of standards is defined by the Third Generation Partnership Project 2 (3GPP2). In the example of FIG. 1, the first type of wireless access network 100 is referred to as a 3GPP access network, which can be either a GSM/UMTS access network or a CDMA 2000 access network.

The second type of wireless access network 102 is a wireless local area network (WLAN) access network. In FIG. 1, the second type of wireless access network 102 is referred to as a WLAN access network. A WLAN typically operates according to a different wireless technology than that employed in the 3GPP access network 100. Protocols that define WLANs include IEEE 802.11, IEEE 802.11a, IEEE 802.11b, IEEE 802.11g, IEEE 802.16, IEEE 802.20, WiMax, and so forth. Technologies employed in such networks can include spread spectrum technologies such as CDMA and orthogonal frequency division multiplexing (OFDM).

Although reference is made to various existing wireless access network standards, it is contemplated that techniques according to some embodiments can be applied to other types of wireless access networks, including wireless access networks that operate according to future standards.

The WLAN access network 102 includes base stations 110 for communicating wirelessly with mobile stations. The 3GPP access network 100 includes a base transceiver station (BTS) 104 connected to a base station controller (BSC) 106. Although only one base station 110 is depicted in FIG. 1, a typical WLAN access network 102 would include multiple base stations 110. Similarly, although only one BTS and BSC is depicted in FIG. 1, a typical 3GPP access network 100 would include multiple BTSs 104 and BSCs 106. A BTS communicates wirelessly with a mobile station (such as mobile station 111) using radio frequency (RF) links. A BTS is also referred to as an access point, and a BSC is also referred to a radio network controller (RNC).

The 3GPP access network 100 is coupled to a serving GPRS support node (SGSN) 112. The SGSN 112 is used in a GSM or UMTS network. However, the SGSN 112 is not used in a CDMA 2000 network.

FIG. 1 also includes access gateway nodes (AGNs) 114, 116. An access gateway node is provided at the edge of a wireless network for routing data between a mobile station in the wireless network and external network devices coupled to an external data network 118, such as the Internet or some other type of packet data network. An access gateway node includes several functions, including a gateway GPRS support node (GGSN) function and a packet data gateway (PDG) function. The GGSN function is used as the access gateway to enable communication between a mobile station (connected to a GSM/UMTS access network) and the external data network 118. The PDG function is used as the access gateway to enable communication between a mobile station (connected to a WLAN access network) and the external data network 118. Alternatively, in the CDMA 2000 context, the access gateway node can include a packet data serving node (PDSN) for routing data between a mobile station and the external data network 118.

In some embodiments, home agents (122 and 124 depicted in FIG. 1) are also implemented in respective access gateway nodes 114 and 116. A home agent is a router on a mobile station's home network which tunnels data packets for delivery to the mobile station when the mobile station is away from home, and maintains current location information for the mobile station.

Although each access gateway node 114, 116 is described as including several functions (e.g., GGSN function, PDG function, PDSN function, home agent function), it is noted that in other embodiments, each access gateway node 114, 116 can include just one function (or a smaller number of functions).

In FIG. 1, the 3GPP access network 100 and the WLAN access network 102 are considered wireless access networks to enable wireless access by mobile stations 111 of the external data network 118. In the example of FIG. 1, a services block 120 is provided, where the services block 120 contains components associated with a service provider. In other embodiments, the services block 120 can be omitted so that the access gateway nodes are connected to the external data network 118.

In a data session between a mobile station connected to a wireless access network and an external network device connected to the external data network 118, the mobile station 111 appears to the external network device as being located at the access gateway node 114 or 116, since the access gateway node is the point to which data packets containing the mobile station's external IP (Internet Protocol) address are routed. The Internet Protocol is a protocol that defines packet-switched communications in data networks. One version of IP is described in Internet Engineering Task Force (IETF) Request for Comments (RFC) 791, entitled "Internet Protocol," dated September 1981; and another version of IP is described in RFC 2460, entitled "Internet Protocol, Version 6, IPv6 Specification," dated December 1998.

In some implementations, the interface between the access gateway node and the services block 120 or external data network 118 is referred to as a Gi interface. In a data session between the mobile station 111 and an external network device connected to the external data network 118, data packets sent by an external device and targeted to a mobile station 111 are routed to the Gi interface (or other interface) of the access gateway node. Effectively, the access gateway node is the anchor point for the data flows of the mobile station 111 as the mobile station moves around in a wireless access network.

Normally, multiple access gateway nodes are provided for the purpose of load sharing, where different ones of the access gateway nodes are selected for new data sessions (such as by using a round-robin algorithm). For example, the access gateway nodes can be arranged in a server farm to handle large network loads.

Conventionally, if the mobile station transitions (hands off) from one of the wireless access networks 100, 102 to another one of the wireless access networks 100, 102, and a new data session has to be established, then that may result in a different access gateway node being selected for the new data session due to the change in wireless access networks. A change in the access gateway node will result in a change in the external IP address of the mobile station, which is undesirable. In embodiments in which a home agent is incorporated in the access gateway node, a change in access gateway nodes due to a mobile station transitioning from one wireless access network to another wireless access network may cause an extra hop to be involved for a mobile station to get back to the home agent that anchors the mobile station's IP address.

In accordance with some embodiments of the invention, to enable handoff between different types of wireless access networks while the mobile station is involved in a data session where the hosting access gateway node does not change, a temporary access point name (APN) is communicated to a mobile station 111 for storage by the mobile station. An APN is a label (or domain name), in accordance with DNS (Domain Name Server) naming conventions, that describes or indicates the access point to the external data network 118. Details of DNS are described in RFC 1035, entitled "Domain Names—Implementation and Specification," dated November 1987.

The temporary APN is used by the mobile station 111 when the mobile station transitions between the first type of wireless access network 100 and the second type of wireless access network 102. When a mobile station transitions between two different types of wireless access networks, the temporary APN enables the mobile station to discover the IP address of the specific access gateway node that was serving the mobile station prior to the transition, so that the same access gateway node can be maintained for the data session of the mobile station. As a result, the data session over the new wireless access network can be maintained without changing the external IP address of the mobile station to achieve a seamless handoff between different types of wireless access networks. Although the external IP address (on the Gi side of the access gateway node) does not change, the local IP address within the core network associated with the wireless network between the access gateway node and the mobile station may change.

The temporary APN is sent to the mobile station 111 when the mobile station first establishes a communications session in a wireless access network. The temporary APN can be received by the mobile station 111 during or after initialization of a communications session (data session) by the mobile station in the wireless access network. There are various embodiments that are employed for communicating the temporary APN to the mobile station. In these various embodiments, different types of messages are used to communicate the temporary APN to the mobile station. The messages used depend upon the type of handoff performed between different types of wireless access networks. One type of handoff is a layer 2 link switch, while another type of handoff is a layer 3 handoff.

In embodiments where a layer 2 link switch is performed to transition a mobile station between the first and second types of wireless access networks, a message used for communicating the temporary APN can be a message exchanged during a security negotiation or dialogue between the mobile station and the access gateway node. For example, the temporary APN can be contained in a vendor-specific Configuration Payload information element of an IKE_AUTH Response message, which is part of the initial exchange of messages defined by the Internet Key Exchange (IKE) protocol. Version 2 of IKE is described in RFC 4306, entitled "Internet Key Exchange (IKEv2) Protocol," dated December 2005. IKE is a component of IPsec used for performing mutual authentication and establishing and maintaining Security Associations (SAs). IPsec (Internet Protocol Security) provides for secure communications over IP networks. IPsec is described in RFC 2401, entitled "Security Architecture for the Internet Protocol," dated November 1998.

In embodiments that employ a layer 2 link switch for transitioning between different types of wireless networks, an alternative message that can be used for communicating a temporary APN to the mobile station is a message used for packet data protocol (PDP) context activation. A PDP context is a logical association between a mobile station and an external data network over a wireless access network. The PDP context defines a PDP type, a PDP address, and a QoS (quality-of-service) profile. In one example, the temporary APN can be communicated in a Protocol Configuration Options information element in a Create PDP Context Response message or an Update PDP Context Response message, which are messages communicated during PDP context activation.

In some implementations, the fields contained in the messages discussed above for carrying the temporary APN can be proprietary fields (vendor-specific fields). In other implementations, the fields contained in the messages can be standardized fields, which may require changes to the appropriate standards, such as 3GPP, 3GPP2, or IETF standards.

In embodiments in which layer 3 handover is performed between different types of wireless access networks, a Mobile IP message can be used to communicate the temporary APN to the mobile station. Mobile IP is a protocol that enables a mobile station to change its point of attachment between a first wireless access network and another wireless access network. Mobile IP, Version 4, is described in RFC 3220, entitled "IP Mobility Support for IPv4," dated January 2002. Mobile IP, Version 6, is described in RFC 3775, entitled "Mobility Support in IPv6," dated June 2004.

In embodiments where Mobile IP is used, a message for carrying the temporary APN to the mobile station can be the Mobile IPv4 Registration Response message, which is sent back to the mobile station in response to a Mobile IPv4 Registration Request message sent by the mobile station when the mobile station registers with its home agent so that the home agent can create or modify a mobility binding for that mobile station. In FIG. 1, home agents 122 and 124 are depicted as being part of access gateway nodes 114 and 116, respectively. Alternatively, the home agents 122 and 124 can be separate nodes.

The Registration Request message and Registration Response message are Mobile IPv4 messages. In the Mobile IPv6 context, a mobile station sends a Binding Update message to its home agent to cause a binding for the mobile station to be registered. In response to the Binding Update message, the home agent responds with a Binding Acknowledgment message, which can be used to contain the temporary APN in an option header. In such an embodiment, the existing Mobile IPv6 protocol can be extended to provide for a temporary APN option header (or option headers).

With the Mobile IP embodiments, vendor-specific fields or standardized fields can be used for communicating the temporary APN in different implementations.

In accordance with some embodiments, there are actually two types of temporary APNs. A first type of temporary APN is sent to the mobile station when the mobile station attaches to the WLAN access network 102. This temporary APN is referred to as "Temp APN." On the other hand, if the mobile station attaches to the 3GPP access network 100, then a second type of temporary APN, referred to as "Temp W-APN," is sent to the mobile station. The use of different types of temporary APNs results from the fact that a mobile station is connected to an access gateway node over a public core network (126 in FIG. 1) when the wireless access network is the WLAN network 102, but the mobile station is coupled to the access gateway node over a private core network (128 in FIG. 1) when the 3GPP access network 100 is used.

As depicted in FIG. 1, a public DNS 130 is connected to the public core network 126, whereas a private DNS 132 is connected to the private core network 128. The Temp W-APN is used by the mobile station when querying the public DNS 130, while Temp APN is used for querying the private DNS 132. In other embodiments, only one type of temporary APN and one type of DNS are used.

Each of the public DNS 130 and private DNS 132 contains information mapping domain names to corresponding IP addresses. In the public DNS 130, a normal W-APN value (different from a Temp W-APN value) is mapped to one or plural IP addresses of one or plural corresponding access gateway nodes. On the other hand, in the public DNS 130, a Temp W-APN value is mapped to a single IP address of an access gateway node (the access gateway node involved in the existing data session of a particular mobile station).

Similarly, in the private DNS 132, a normal APN value (different from a Temp APN value) is mapped to one or plural IP addresses of one or plural corresponding access gateway nodes. On the other hand, in the private DNS 132, a Temp APN value is mapped to a single IP address of an access gateway node (the access gateway node involved in the existing data session of a particular mobile station).

As further depicted in FIG. 1, the mobile station 111 includes a central processing unit (CPU) 140 connected to a memory 142. Software 138 is stored in the memory 142 and executable on the CPU 140 to perform various tasks associated with the mobile station, including tasks according to some embodiments. The access gateway node, DNS, and other nodes in FIG. 1 similarly include corresponding CPUs, memories, and software.

Figure 2:
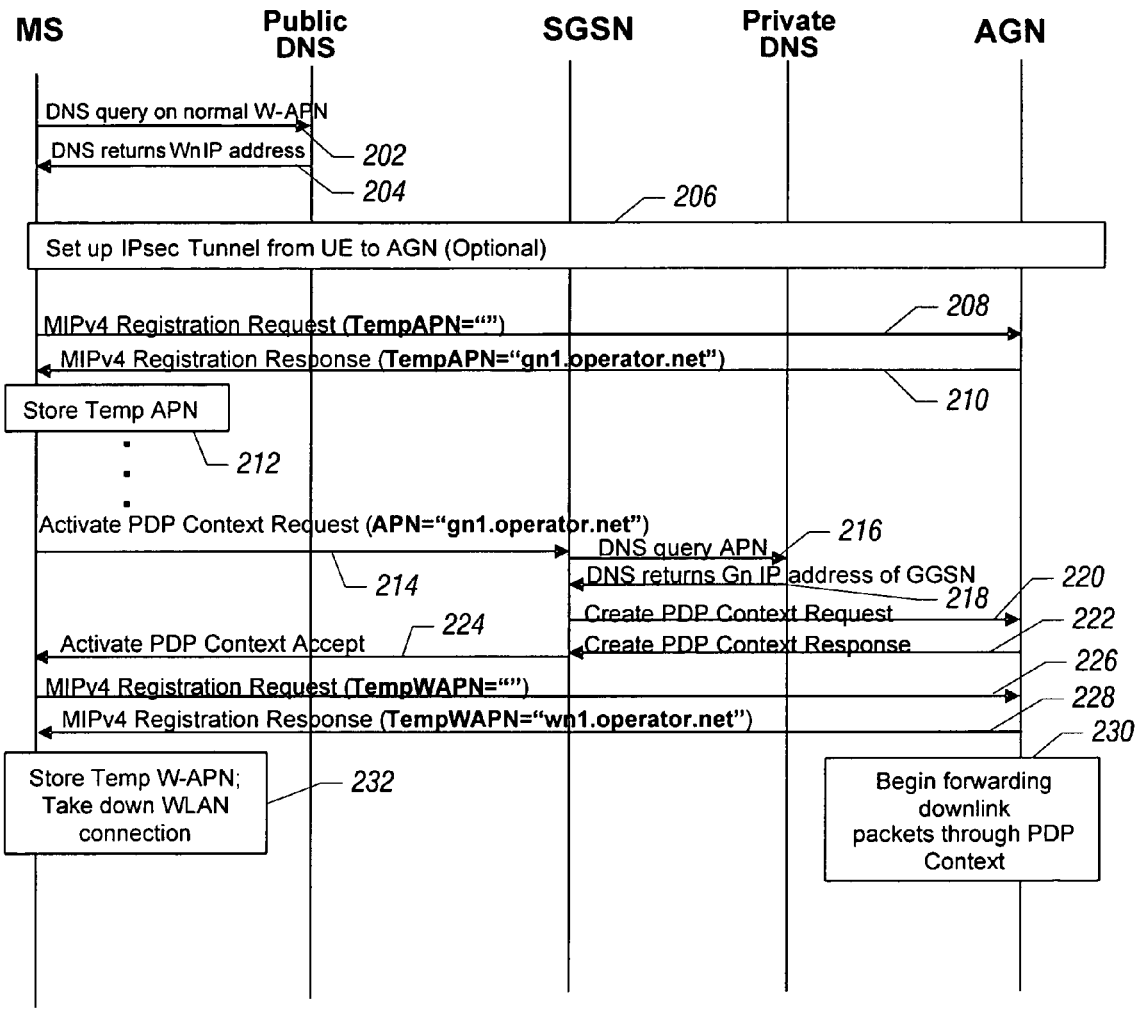
FIGS. 2 and 3 are message flow diagrams of procedures for maintaining use of the same access gateway node when transitioning between first and second types of wireless networks, in accordance with an embodiment.
Figure 3:
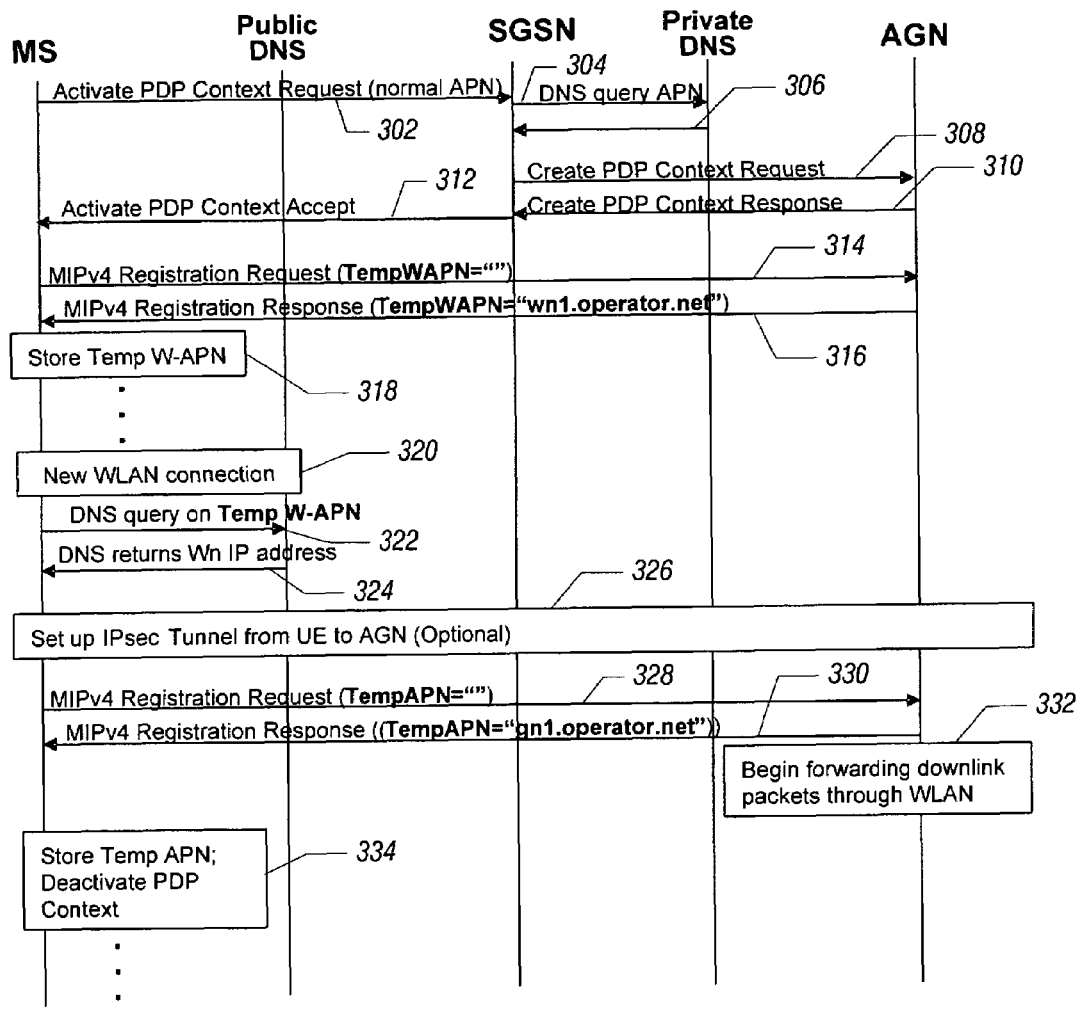

FIGS. 2 and 3 show example message flow diagrams of procedures for performing layer 3 handover between the WLAN access network 102 and a 3GPP access network 100, where Mobile IP messages are used for communicating a temporary APN to the mobile station. FIG. 2 shows the scenario where the mobile station first starts in the WLAN access network 102. Upon attachment to the WLAN access network 102, the mobile station sends a DNS query containing a normal W-APN value (a domain name) to the public DNS 130 (FIG. 1). The W-APN value is configured in the mobile station (in other words, the W-APN is prestored in the mobile station). The W-APN value is submitted in the DNS query to the public DNS 130 to enable the public DNS 130 to select one of plural access gateway nodes for use by the mobile station in a data session. As noted above, in the DNS 130, a normal W-APN value, is mapped to plural IP addresses of corresponding access gateway nodes. The W-APN and its use are defined in 3GPP specifications, including 3GPP TS 23.234 AND 3GPP TS 23.003. The specific access gateway node is selected from a list of access gateway nodes that are mapped to the W-APN value, such as based on a round-robin algorithm for load distribution purposes. In response to the DNS query, the public DNS 130 sends (at 204) the IP address associated with the selected access gateway node to the mobile station. In one example embodiment where GPRS is used, the IP address sent by the public DNS 130 to the mobile station is the IP address of the Wn interface, which is the interface for communicating data between the WLAN access network 102 and the PDG function of the access gateway node.

Optionally, the mobile station can set up (at 206) an IPsec tunnel between the mobile station and the access gateway node. Setting up the IPsec tunnel between the mobile station and the access gateway node enables secure communications between the mobile station and the access gateway node.

The mobile station also sends (at 208) a Mobile IPv4 Registration Request message to the home agent of the selected access gateway node, using the IP address received from the DNS 130 at 204. The Registration Request message contains a temporary APN extension that is vendor-specific, in one implementation. This vendor-specific APN extension of the Registration Request message contains no value and has zero length, and is used to indicate to the home agent that the mobile station supports temporary APN and is requesting that a temporary APN value be returned to the mobile station. The home agent responds (at 210) to the Registration Request message with a Registration Response message, where the Registration Response message contains a temporary APN vendor-specific extension that contains an assigned Temp APN value, in this example, "gn1.operator.net."

If Mobile IPv6 is used instead of Mobile IPv4, the technique is similar. In the Mobile IPv6 context, the mobile station sends a Binding Update message to the home agent containing an option header with option type "Temp APN" that has an empty value. In response to this Binding Update message, the home agent responds with a Binding Acknowledgment message containing the temporary APN option header with the assigned Temp APN value.

Upon receiving the Temp APN value, the mobile station stores (at 212) the Temp APN value. Later, to handoff from the WLAN access network 102 to the 3GPP access network 100, the mobile station establishes a connection with the 3GPP access network 100. Such a connection is initiated by an Attach procedure (not shown), followed by sending (at 214) an Activate PDP Context Request message to the SGSN 112 (FIG. 1). The Activate PDP Context Request message is used for activating a PDP context, such as a primary PDP context. The Activate PDP Context Request message that is sent to the SGSN, as defined in 3GPP specifications (e.g., TS 23.060), contains an APN field. However, in accordance with some embodiments, instead of sending a normal APN value in the Activate PDP Context Request, the APN field of the Activate PDP Context Request sent at 214 contains the Temp APN value, which in this example is "gn1.operator.net." It is noted that the format of the Activate PDP Context Request message has not been modified in this embodiment, as existing Activate PDP Context Request messages already include an APN field for carrying APN values.

In response to the Activate PDP Context Request message containing the Temp APN value, the SGSN 112 submits a DNS query (at 216) to the private DNS 132. The APN contained in the DNS query sent at 216 is the Temp APN value. The private DNS 132 is similar to the public DNS 130 in that the private DNS 132 also maps normal domain names to plural IP addresses of corresponding access gateway nodes. However, in the private DNS 132, a Temp APN value is mapped to only a single IP address of an access gateway node (which is the access gateway node associated with the existing data session that the mobile station is involved in while the mobile station is connected to the WLAN access network 102).

In response to the DNS query, the private DNS 132 retrieves the IP address of the access gateway node of the existing data session using the Temp APN value. The private DNS 132 then returns (at 218) the retrieved IP address to the SGSN. In one example embodiment where GPRS is used, the IP address returned is the IP address of a Gn interface associated with the selected access gateway node.

Upon receiving the IP address of the access gateway node used in the existing data session, the SGSN sends (at 220) a Create PDP Context Request message to the access gateway node. The access gateway node responds with a Create PDP Context Response message (at 222) that is sent to the SGSN, which in turn sends the Activate PDP Context Accept message (at 224) to the mobile station. After receiving the Activate PDP Context Accept message from the SGSN, the requested PDP context over the 3GPP access network is established.

Next, the mobile station sends (at 226) a Mobile IPv4 Registration Request message, which contains a vendor-specific temporary W-APN extension, to the corresponding home agent. In response to the Registration Request message, the home agent sends a Registration Response message to the mobile station with the Temp W-APN value in the temporary W-APN extension of the Registration Response message. After sending the Registration Response message (at 228) to the mobile station, the access gateway node begins forwarding (at 230) downlink traffic packets to the mobile station through the PDP context to the SGSN. The access gateway node stops forwarding downlink traffic through the WLAN connection.

Upon receiving the Registration Response message containing the Temp W-APN value, the mobile station stores the Temp W-APN value and takes down the WLAN connection (at 232). Subsequently, the mobile station may remain connected to the 3GPP access network 100, or alternatively, the mobile station may transition back to the WLAN access network 102, in which case the stored Temp W-APN value is used to select the same access gateway node that is involved in the existing data session.

FIG. 3 shows a message flow diagram in the scenario where the mobile station starts up in the 3GPP access network 100 (instead in the WLAN access network 102 as in FIG. 2). When starting up in the 3GPP access network, the mobile station sends (at 302) an Activate PDP Context Request Message, which contains a normal APN (instead of the temporary APN communicated at 214 in FIG. 2). The SGSN sends a DNS query containing the normal APN to the private DNS 132, which causes the private DNS to perform a round-robin selection of an access gateway node (from among plural access gateway nodes) based on the normal APN. The private DNS sends (at 306) the IP address (e.g., Gn IP address) of the selected access gateway node to the SGSN. The SGSN then sends (at 308) a Create PDP Context Request message to the selected access gateway node, which responds (at 310) with a Create PDP Context Response message. The SGSN then sends (at 312) an Activate PDP Context Accept message to the mobile station. At this point, the PDP context over the 3GPP access network 100 is established.

Next, the mobile station sends a Mobile IPv4 Registration Request message (at 314) to the home agent in the access gateway node, where the Registration Request message contains a temporary W-APN vendor-specific extension, which is assigned no value. In response, the home agent sends (at 316) a Registration Response message with the temporary W-APN extension containing the Temp W-APN value, which in this example is "wn1.operator.net." The Temp W-APN value is stored (at 318) by the mobile station.

If Mobile IPv6 instead of Mobile IPv4 is used, the messages sent at 314 and 316 would be Binding Update and Binding Acknowledgment, respectively.

Later, the mobile station connects to the WLAN access network (at 320) (in other words, the mobile station transitions from the 3GPP access network to the WLAN access network). This transition is performed using an Attach procedure (not shown). The mobile station submits a DNS query (containing the Temp W-APN value stored at 318) to the public DNS 130. The Temp W-APN value is mapped to the IP address of the access gateway node of the existing data session in the public DNS 130. The public DNS 130 then responds (at 324) with the IP address of such access gateway node (e.g., the IP address of the Wn interface).

Optionally, the mobile station next sets up (at 326) an IPsec tunnel between the mobile station and the access gateway node. The mobile station then sends (at 328) a Mobile IPv4 Registration Request message containing a temporary APN extension set to no value. The home agent responds (at 330) with the Temp APN value in the Registration Response message. The access gateway node then begins forwarding (at 332) downlink packets through the WLAN access network instead of the 3GPP access network. The Temp APN value is stored (at 334), and the PDP context is deactivated to tear down the 3GPP access network connection.

Figure 4:
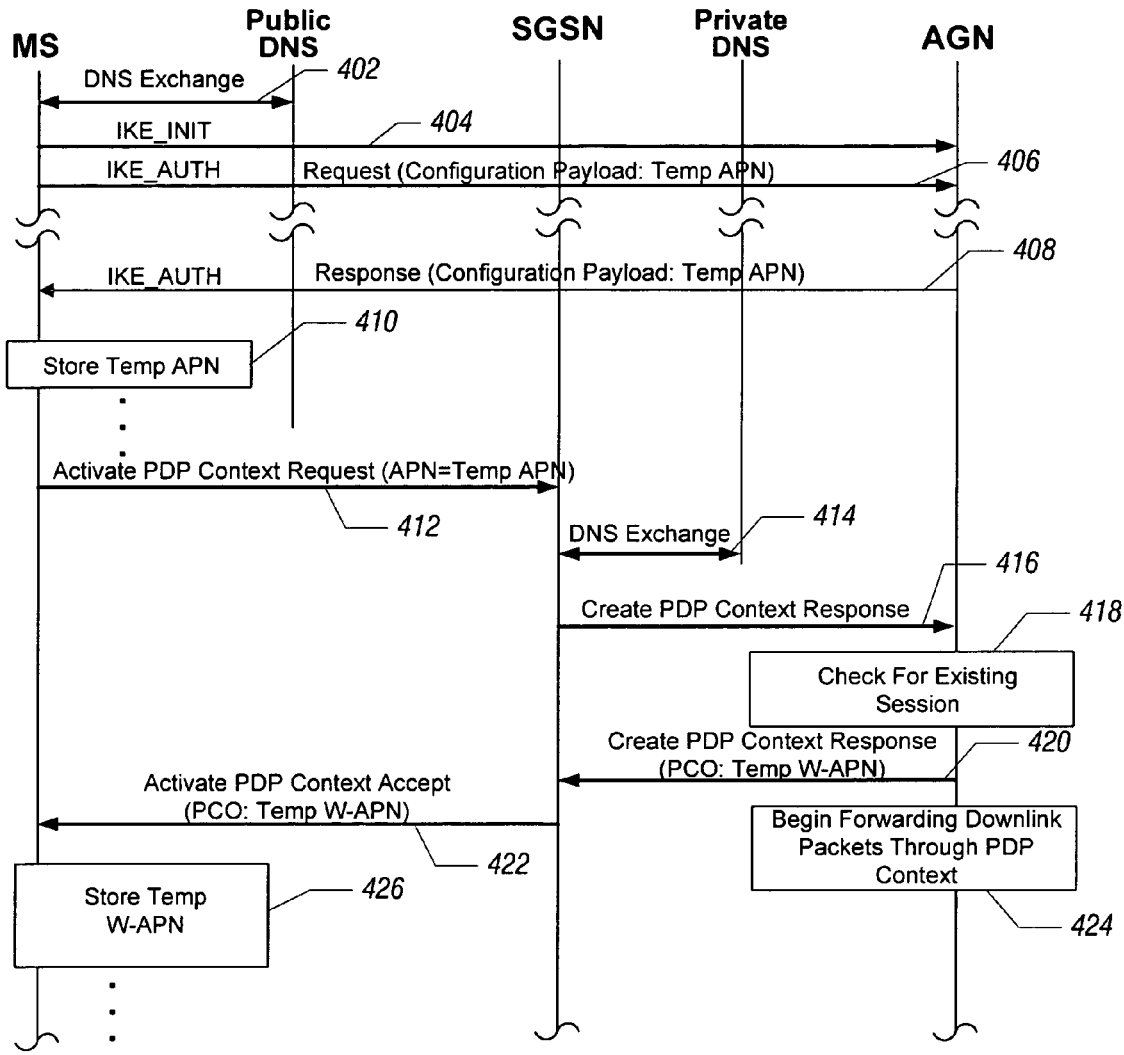
FIGS. 4 and 5 are message flow diagrams of procedures for maintaining use of the same access gateway node when transitioning between first and second types of wireless networks, in accordance with another embodiment.
Figure 5:
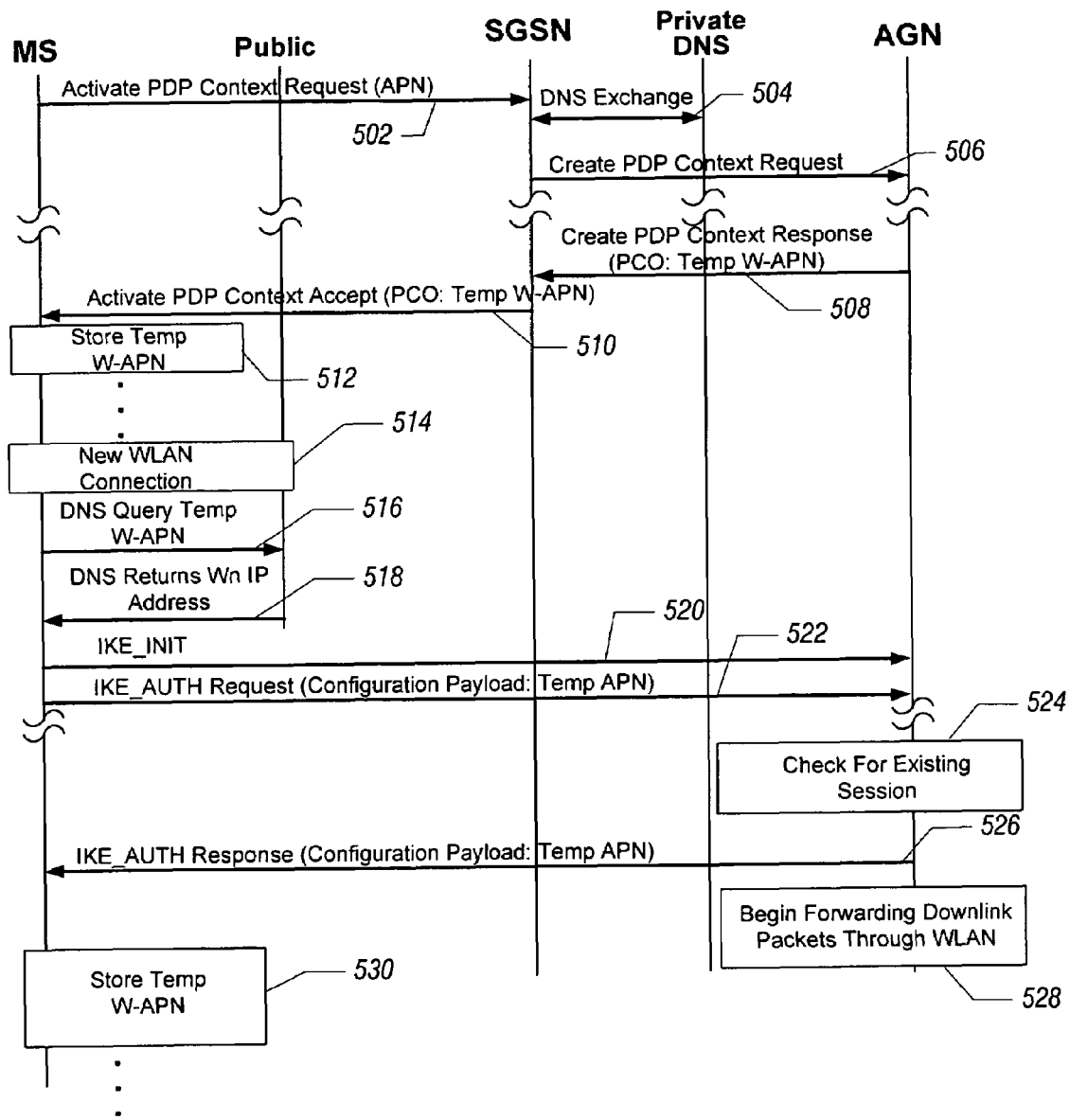

FIGS. 4 and 5 illustrate message flow diagrams for transitioning a mobile station between the WLAN access network 102 and the 3GPP radio access network 100 when layer 2 link switch is employed (rather than the layer 3 handover of FIGS. 2 and 3). The FIG. 4 message flow assumes that the mobile station initiates WLAN access when no existing PDP context or WLAN connection exists. In this case, the mobile station performs a normal DNS exchange (at 402) similar to the DNS exchange at 202 and 204 in FIG. 2. The mobile station then initiates an IKE negotiation by sending (at 404) an IKE_INIT message to the access gateway node. This begins the IKE dialogue, in which the mobile station sends (at 406) an IKE_AUTH Request to the access gateway node. The IKE_AUTH Request contains a vendor-specific Configuration Payload information element which contains a temporary APN attribute. The temporary APN attribute in the Configuration Payload information element of the IKE_AUTH Request is assigned no value.

After further IKE negotiation, the access gateway node determines that there is no existing session for the mobile station. Consequently, the access gateway node sends (at 408) an IKE_AUTH Response message that also contains a Configuration Payload information element with a Temp APN attribute assigned to a Temp APN value. The mobile station stores (at 410) the Temp APN value.

At some later point in time, to hand off from the WLAN access network to the 3GPP access network, the mobile station performs an Attach procedure (not shown), followed by sending (at 412) an Activate PDP Context Request message with the APN field of the Activate PDP Context Request message set to the Temp APN value. The Activate PDP Context Request message also contains a vendor-specific Protocol Configuration Options information element (not shown) that has a temporary W-APN attribute (which is assigned no value in the Activate PDP Context Request message). In response to the Activate PDP Context Request message, a DNS exchange is performed (at 414) with the private DNS 132, which exchange is similar to the DNS exchange at 216, 218 in FIG. 2. The SGSN next sends (at 416) a Create PDP Context Request message to the access gateway node selected by the private DNS based on the Temp APN value. The Create PDP Context Request message contains a vendor-specific Protocol Configuration Options information element (not shown) that has a temporary W-APN attribute (which is assigned no value in the Create PDP Context Request message). The access gateway node, in response to the Create PDP Context Request message, checks (at 418) for an existing data session involving the mobile station. If such an existing session is found, the access gateway node sends (at 420) a Create PDP Context Response message, which contains a vendor-specific Protocol Configuration Options information element having the temporary W-APN attribute assigned to the Temp W-APN value. This Temp W-APN value is passed from the SGSN to the mobile station (at 422) in the Activate PDP Context Accept message, which also contains a Protocol Configuration Options information element having the temporary W-APN attribute. Once the access gateway node has sent the Create PDP Context Response message, the access gateway node begins (at 424) forwarding downlink packets through the PDP context of the 3GPP access network (instead of through the WLAN access network).

The mobile station stores (at 426) the Temp W-APN value received from the SGSN for subsequent use should the mobile station transition back to the WLAN access network 102.

FIG. 5 shows a message flow for when the mobile station first starts up in the 3GPP access network 100. The mobile station sends (at 502) an Activate PDP Context Request message to the SGSN, where this message contains a normal APN. In response, the SGSN performs (at 504) a DNS exchange with the private DNS 132, which selects a access gateway node and returns a corresponding IP address to the SGSN. The SGSN, in response, sends (at 506) a Create PDP Context Request message. Note that each of the Activate PDP Context Request message (502) and Create PDP Context Request message (506) contains a vendor-specific Protocol Configuration Options information element (not shown) that has a temporary W-APN attribute (which is assigned no value). Upon determining that there is no existing data session, the access gateway node sends (at 508) a Create PDP Context Response message, which contains a Protocol Configuration Options information element with the temporary W-APN attribute, which is assigned a Temp W-APN value. The Temp W-APN value is forwarded to the mobile station in an Activate PDP Context Accept message (at 510). The Temp W-APN value is stored (at 512) in the mobile station. Alternatively, instead of sending the Temp W-APN value in an Activate PDP Context Response message, the Temp W-APN value can be sent in an Update PDP Context Response message that also contains a Protocol Configuration Options information element with a temporary W-APN attribute.

Later, when a new WLAN connection is established (at 514) (due to handover from 3GPP access network to WLAN access network), the mobile station sends a DNS query (at 516) for the Temp W-APN value to the public DNS 130. The public DNS 130 returns (at 518) the IP address (e.g., Wn IP address) of the access gateway node associated with the existing data session. Upon receiving the IP address, the mobile station sends (at 520) an IKE_INIT message to the access gateway node (associated with the Wn IP address) to begin an IKE dialogue. The mobile station then sends (at 522) an IKE_AUTH Request message to the access gateway node, which IKE_AUTH Request message contains a vendor-specific Configuration Payload information element having a temporary APN attribute (with zero value in the request message). After further IKE dialogue, the access gateway node checks (at 524) for an existing session involving the mobile station. Since such an existing session exists, the access gateway node sends (at 526) an IKE_AUTH Response message that contains the Configuration Payload information element with the temporary APN attribute assigned to a Temp APN value. At this point, the access gateway node begins (at 528) forwarding downlink packets through the WLAN access network 102. The mobile station also stores (at 530) the Temp APN value received in the IKE_AUTH Response message and tears down the 3GPP access network connection.

Figure 6:
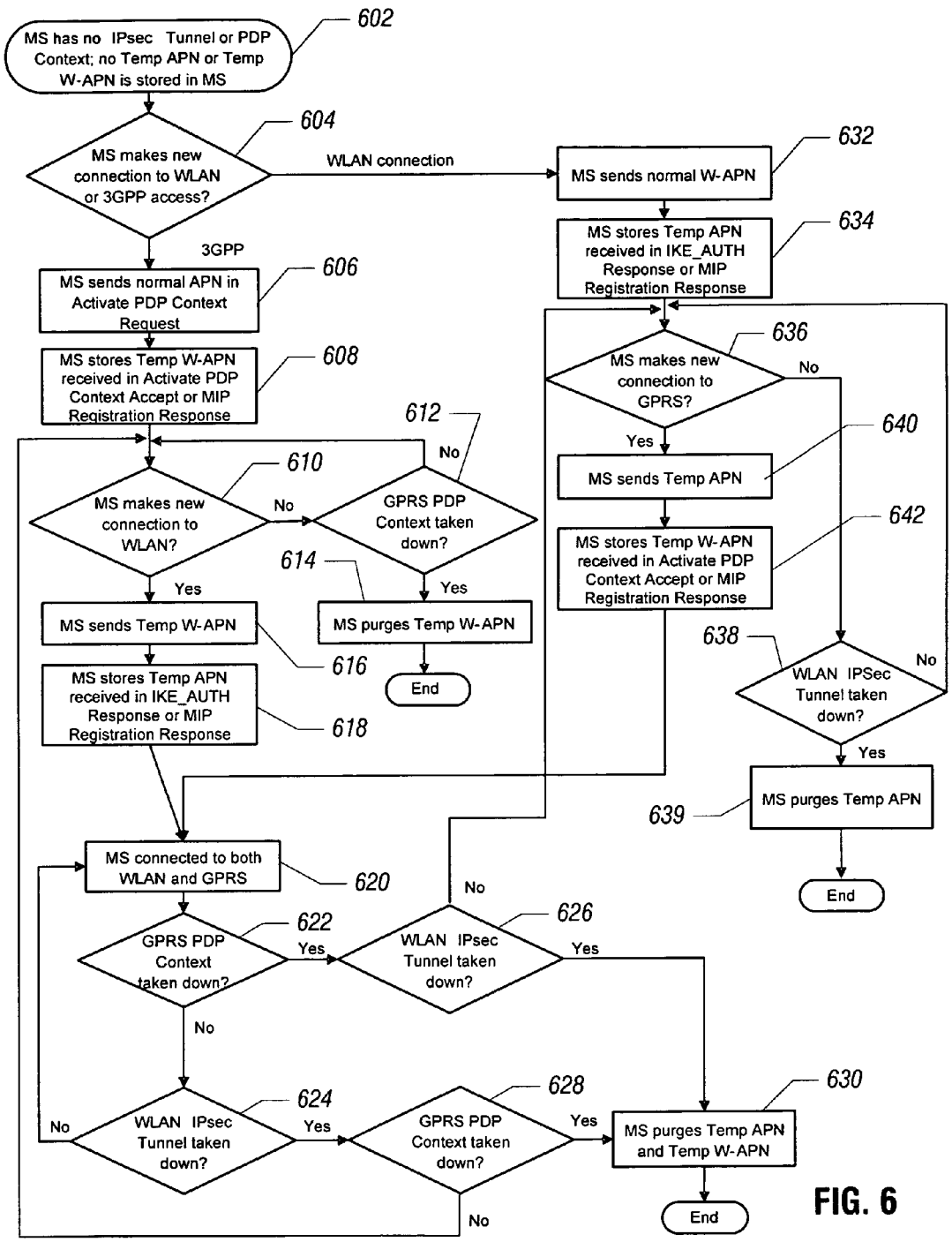
FIG. 6 is a flow diagram of a process performed in a mobile station, according to some embodiments.

FIG. 6 shows a flow chart of tasks performed in the mobile station, according to an embodiment. Initially, at 602, the mobile station does not have an IPsec tunnel or a PDP context (in other words, the mobile station is not connected on the WLAN access network or the 3GPP access network). The mobile station next determines (at 604) whether the mobile station has established a new connection to the WLAN access network or 3GPP access network. If a connection is made to the 3GPP access network, the mobile station sends (at 606) a normal APN in an Activate PDP Context Request message, and the mobile station stores (at 608) a Temp W-APN value received in a responsive Activate PDP Context Accept message. Next, the mobile station determines (at 620) whether it has made a new connection to a WLAN access network (a handover has occurred). If not, the mobile station next determines (at 612) whether the GPRS PDP context has been taken down (in other words, whether the mobile station has terminated its connection with the 3GPP access network). If not, control proceeds back to task 610. However, if the GPRS PDP context has been taken down, the mobile station purges (at 614) the Temp W-APN value from its storage.

If, at 610, the mobile station determines that it has made a new connection to a WLAN access network, the mobile station sends (at 616) a Temp W-APN value (such as in a DNS query, as in task 322 in FIG. 3, and task 516 in FIG. 5) to enable the selection of the access gateway node associated with the existing data session. The mobile station then stores (at 618) a Temp APN value received in a message such as the IKE_AUTH Response message or a Mobile IPv4 Registration Response message sent to the mobile station by the access gateway node.

At this point, the mobile station may be connected (at 620) to both the WLAN and the 3GPP access networks. The mobile station next determines (at 622) whether the GPRS PDP context has been taken down. If not, the mobile station determines (at 624) whether the WLAN IPsec tunnel has been taken down. If neither the GPRS PDP context nor the WLAN IPsec tunnel has been taken down, then the mobile station remains connected to both the WLAN and 3GPP access networks. However, if the GPRS PDP context is determined (at 622) to be taken down, the mobile station next determines (at 626) if the WLAN IPsec tunnel has also been taken down. If not, then control proceeds to task 636, described further below.

If the WLAN IPsec tunnel has been taken down, as determined at 626, the mobile station purges (at 630) both the Temp APN value and the Temp W-APN value, since the mobile station at this point is not connected to either the WLAN access network or 3GPP access network.

Similar decisions are made at 624 and 628 regarding whether or not both the WLAN and 3GPP access network connections have been taken down and whether the Temp APN and Temp W-APN values should be purged at 630.

At 604, if the mobile station determines it has made a new connection to the WLAN access network, then the mobile station sends (at 632) the normal W-APN to the public DNS. The mobile station stores (at 634) the Temp APN value received in an IKE_AUTH Response or Mobile IPv4 Registration Response. Next, the mobile station determines (at 636) if a new connection to a 3GPP access network has been made. If not, the mobile station determines (at 638) whether the WLAN IPsec tunnel has been taken down. If not, control proceeds back to task 636. However, if the WLAN IPsec tunnel has been taken down, then the mobile station purges (at 639) the Temp APN value.

If the mobile station has made a new connection to the 3GPP access network, as determined at 636, the mobile station sends (at 640) the Temp APN value in an Activate PDP Context Request message to enable selection of the access gateway node associated with the existing data session. In response, the mobile station receives a message containing the Temp W-APN value. The Temp W-APN value is stored (at 642) by the mobile station, and control proceeds to task 620, as discussed above.

Using the techniques according to some embodiments discussed above, an effective mechanism is provided to enable seamless handoff of a mobile station involved in an existing data session between different types of wireless access networks. Flexibility exists in how a temporary APN is provided to the mobile station such that the mobile station can communicate this temporary APN to maintain the continued use of the same access gateway node as the mobile station transitions between the different types of wireless access networks.

Instructions of the various software modules (e.g., software modules executed in the mobile station, access gateway node, DNS, and so forth) are loaded for execution on corresponding processors. Processors include microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data and instructions (of the software) are stored in respective storage devices, which are implemented as one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

The instructions of the software are loaded or transported to each entity in one of many different ways. For example, code segments including instructions stored on floppy disks, CD or DVD media, a hard disk, or transported through a network interface card, modem, or other interface device are loaded into the entity and executed as corresponding software routines or modules. In the loading or transport process, data signals that are embodied in carrier waves (transmitted over telephone lines, network lines, wireless links, cables, and the like) communicate the code segments, including instructions, to the entity. Such carrier waves are in the form of electrical, optical, acoustical, electromagnetic, or other types of signals.

While some embodiments have been disclosed with respect to a limited number of embodiments, those skilled in the art will appreciate numerous modifications and variations there from. It is intended that the appended claims cover such modifications and variations as fall within the true spirit and scope of the invention.

What is claimed is:

1. A method comprising:
   receiving, by a mobile station, a first access point name associated with an access gateway node involved in a data session of the mobile station over a first type of wireless network; and
   in response to handoff of the mobile station from the first type of wireless network to a second, different type of wireless network, the mobile station transmitting the first access point name to enable continued use of the access gateway node for the data session of the mobile station over the second type of wireless network, wherein further data associated with the data session of the mobile station over the second type of wireless network continues to be received from the access gateway node after the mobile station has disconnected from the first type of wireless network.

2. The method of claim 1, wherein receiving the first access point name comprises receiving the first access point name in one of:
   a message communicated during context activation;
   a message communicated during a security negotiation procedure; and
   a message communicated during Mobile Internet Protocol registration.

3. The method of claim 1, wherein receiving and transmitting the first access point name comprises receiving and transmitting a temporary access point name different from a normal access point name sent by the mobile station to cause selection of the access gateway node from among plural access gateway nodes.

4. The method of claim 1, wherein receiving the first access point name comprises receiving the first access point name in one of a Mobile Internet Protocol Registration Response message and a Mobile Internet Protocol Binding Acknowledgment message.

5. The method of claim 1, wherein transmitting the first access point name comprises transmitting the first access point name in one of an Activate Packet Data Protocol (PDP) Context Accept message and a domain name server (DNS) query.

6. The method of claim 1, wherein transmitting the first access point name comprises transmitting the first access point name in a first message, the method further comprising:
   receiving a second message responsive to the first message, the second message containing an address of the access gateway node.

7. The method of claim 6, wherein receiving the second message containing the address comprises receiving the second message containing the address corresponding to the first access point name, wherein the address is retrieved by a domain name server.

8. The method of claim 1, wherein receiving the first access point name comprises receiving the first access point name in one of a Protocol Configuration Options information element of an Activate Packet Data Protocol (PDP) Context Accept message and a Configuration Payload information element of an $IKE_{13}AUTH$ Response message.

9. The method of claim 1, wherein the first access point name is a temporary access point name, the method further comprising:
   sending a first message containing a normal access point name during an initial startup of the mobile station in the first type of wireless network, wherein the normal access point name enables selection of the access gateway node for the data session being staffed up in the first type of wireless network.

10. The method of claim 1, further comprising:
    receiving a second, different access point name associated with the access gateway node involved in the data session of the mobile station over the second type of wireless network, wherein the first access point name is used for querying a private domain name server, and the second access point name is used for querying a public domain name server.

11. The method of claim 1, wherein receiving the first access point name associated with the access gateway node comprises receiving the first access point name associated with the access gateway node that is provided at an edge of the first type of wireless network for routing data between the mobile station and an external network.

12. A mobile station comprising:
    a controller to initiate a data session over a first type of wireless network, wherein the data session involves an access gateway node; and
    a storage to store a temporary access point name associated with the access gateway node, the temporary access point name received after or during initiation of the data session over the first type of wireless network, wherein the temporary access point name is different from a normal access point name sent by the mobile station to cause selection of the access gateway node, wherein the controller is responsive to handoff of the mobile station from the first type of wireless network to a second, different type of wireless network by communicating the temporary access point name to enable continued use of the access gateway node for the data session of the mobile station over the second type of wireless network.

13. The mobile station of claim 12, wherein one of the types of wireless network comprises a wireless local area network (WLAN), and the other of the types of wireless network comprises a cellular access network.

14. The mobile station of claim 12, wherein the temporary access point name is received in one of:
   a message communicated during context activation;
   a message communicated during a security negotiation procedure; and
   a message communicated during Mobile Internet Protocol registration.

15. The mobile station of claim 12, wherein the handoff of the mobile station is a layer 2 link switch, and wherein the temporary access point name is received in an IKE_AUTH Response message or an Activate PDP Context Accept message.

16. The mobile station of claim 12, wherein the handoff is a layer 3 handoff, and wherein the temporary access point name is received in a Mobile Internet Protocol Registration Response message or a Binding Acknowledgment message.

17. The mobile station of claim 12, wherein after handing off to the second type of wireless network, the controller is operable to further:
   receive a second access point name different from the first access point name associated with the access gateway node; and
   in response to handoff of the mobile station from the second type of wireless network to the first type of wireless network, use the second access point name to enable selection of the access gateway node for the data session of the mobile station over the first type of wireless network.

18. The mobile station of claim 12, wherein the temporary access point name is received from a home agent of the mobile station.

19. The mobile station of claim 12, wherein continued use of the access gateway node involves the mobile station receiving further data associated with the data session of the mobile station over the second type of wireless network from the access gateway node after the mobile station has disconnected from the first type of wireless network.

20. An article comprising at least one computer readable storage medium containing instructions that when executed cause a system to:
   store a temporary access point name and a normal access point name, wherein the normal access point name is mapped to plural addresses of corresponding plural access gateway nodes, and wherein the temporary access point name is mapped to a corresponding address of an access gateway node used by a mobile station in a data session with an external data network;
   in response to receiving a query containing the temporary access point name, retrieve the address mapped to the temporary access point name; and
   send the retrieved address corresponding to the temporary access point name.

21. The article of claim 20, wherein the instructions when executed cause the system to further:
   receive the temporary access point name in a domain name server (DNS) query.

22. The article of claim 20, wherein the instructions when executed causing the system to further:
   receive another query containing the normal access point name; and
   in response to the another query, using an algorithm to select one of the addresses mapped to the normal access point name.

23. The mobile station of claim 12, wherein the access gateway node associated with the temporary access point name is provided at an edge of the first type of wireless network for routing data between the mobile station and an external network.

* * * * *

UNITED STATES PATENT AND TRADEMARK OFFICE
CERTIFICATE OF CORRECTION

PATENT NO. : 7,660,584 B2 Page 1 of 1
APPLICATION NO. : 11/433870
DATED : February 9, 2010
INVENTOR(S) : Stewart H. Maxwell and Jerry L. Mizell It is certified that error appears in the above-identified patent and that said Letters Patent is hereby corrected as shown below:

Column 14:
Line 35, "IKE13AUTH" should be --IKE_AUTH--;
Line 43, "staffed" should be --started--.

Signed and Sealed this

Twenty-third Day of March, 2010

David J. Kappos
*Director of the United States Patent and Trademark Office*